(12) United States Patent
Alexander et al.

(10) Patent No.: US 11,237,949 B2
(45) Date of Patent: *Feb. 1, 2022

(54) SYSTEMS AND METHODS FOR ON-DEMAND CONTAINER-BASED DEVELOPMENT ENVIRONMENTS

(71) Applicant: JPMORGAN CHASE BANK, N.A., New York, NY (US)

(72) Inventors: Shawn Wesley Alexander, Perland, TX (US); Richard Ackroyd, Ferndown (GB); Venkata Naveen Alapati, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,672

(22) Filed: Jul. 20, 2020

(65) Prior Publication Data

US 2020/0349059 A1 Nov. 5, 2020

Related U.S. Application Data

(63) Continuation of application No. 16/107,132, filed on Aug. 21, 2018, now Pat. No. 10,747,650.

(51) Int. Cl.
*G06F 8/76* (2018.01)
*G06F 11/36* (2006.01)
*G06F 9/455* (2018.01)

(52) U.S. Cl.
CPC ............ *G06F 11/3664* (2013.01); *G06F 8/76* (2013.01); *G06F 9/45558* (2013.01); *G06F 2009/45562* (2013.01); *G06F 2009/45591* (2013.01)

(58) Field of Classification Search
CPC ..... G06F 8/61; G06F 8/63; G06F 8/65; G06F 8/71; G06F 9/44526; G06F 9/5077
See application file for complete search history.

(56) References Cited

U.S. PATENT DOCUMENTS 9,542,219 B1   1/2017  Bryant et al.
10,320,625 B1  6/2019  Cherumbath
(Continued)

OTHER PUBLICATIONS

International Search Report, dated Oct. 1, 2019, from corresponding International Application No. PCT/US2019/047482.
(Continued)

*Primary Examiner* — Duy Khuong T Nguyen
(74) *Attorney, Agent, or Firm* — Greenberg Traurig LLP

(57) ABSTRACT

Systems and methods for on-demand container-based development environments are disclosed. According to one embodiment, in an information processing apparatus comprising at least one computer processor a method for using an on-demand development environment may include: (1) receiving, from a user interface, a request for an on-demand development environment for an application binary; (2) verifying that infrastructure for the on-demand development environment is not provisioned; (3) identifying a build template for the on-demand development environment; (4) selecting an endpoint for the on-demand development environment; (5) initiating the on-demand development environment on the endpoint using the build template; and (6) deploying the application binary to the on-demand development environment.

19 Claims, 2 Drawing Sheets

(56) References Cited

U.S. PATENT DOCUMENTS

| | | |
|---|---|---|
| 2014/0143422 A1* | 5/2014 | Joseph .................. G06F 8/60 |
| | | 709/226 |
| 2016/0179499 A1 | 6/2016 | Reeves et al. |
| 2016/0381075 A1* | 12/2016 | Goyal ................ H04L 63/105 |
| | | 713/176 |
| 2017/0249141 A1 | 8/2017 | Parees et al. |
| 2017/0277524 A1 | 9/2017 | Bhat et al. |
| 2017/0329588 A1 | 11/2017 | Lundberg et al. |
| 2018/0095739 A1* | 4/2018 | Baset ................ G06F 21/6218 |
| 2019/0004779 A1 | 1/2019 | Schmidt et al. |
| 2019/0028336 A1 | 1/2019 | Coronado et al. |

OTHER PUBLICATIONS

Written Opinion of the International Searching Authority, dated Oct. 1, 2019, from corresponding International Application No. PCT/US2019/047482.

\* cited by examiner

SYSTEMS AND METHODS FOR ON-DEMAND CONTAINER-BASED DEVELOPMENT ENVIRONMENTS

CROSS-REFERENCE TO RELATED APPLICATION

This application claims the benefit of priority to U.S. Non-Provisional application Ser. No. 16/107,132, filed on Aug. 21, 2018, now U.S. Pat. No. 10,747,650, the entire contents of which are hereby incorporated by reference.

BACKGROUND OF THE INVENTION

1. Field of the Invention

The present invention generally relates to systems and methods for on-demand container-based development environments.

2. Description of the Related Art

Getting access to development environments is often time consuming, process-heavy, complex, and may have a long lead time. Development teams face issues where they are developing across feature branches, but must merge all their code together to run into development environments. Developers often compete for limited resources, and obtaining access to additional resources is complicated, lengthy, and time-consuming. In order to innovate, developers need access to compute on demand without overhead or bureaucracy that occurs in today's environments.

SUMMARY OF THE INVENTION

Systems and methods for on-demand container-based development environments are disclosed. According to one embodiment, in an information processing apparatus comprising at least one computer processor a method for using an on-demand development environment may include: (1) receiving, from a user interface, a request for an on-demand development environment for an application binary; (2) verifying that infrastructure for the on-demand development environment is not provisioned; (3) identifying a build template for the on-demand development environment; (4) selecting an endpoint for the on-demand development environment; (5) initiating the on-demand development environment on the endpoint using the build template; and (6) deploying the application binary to the on-demand development environment.

In one embodiment, the method may further include determining whether a build template exists.

In one embodiment, the on-demand development environment may be a container-based development environment.

In one embodiment, the request may include at least one of a template, a source, a run command, and a port.

In one embodiment, the endpoint may be selected based on at least one functional requirement. The function requirements may include an identification one or more external services required for the application binary or a template received by the user interface.

In one embodiment, the endpoint may be selected based on at least one non-functional requirement. The non-functional requirement may include at least one of a size of the on-demand development environment, an available capacity for the endpoint, a performance of the endpoint, a data sensitivity of the application binary, and a cost of using the endpoint.

In one embodiment, the build template may include at least one of an identification of an operating system, an application infrastructure, an on-demand agent, a port, and debugging tool.

In one embodiment, the build template may include a Docker image, and the Docker image may be retrieved from an image repository.

In one embodiment, the build template may be selected based on a build template used in a prior request for an on-demand development environment.

In one embodiment, the endpoint may be Marathon Mesos, Cloud Foundry, AWS, or Kubernetes.

In one embodiment, the method may further include deactivating the on-demand development environment.

In one embodiment, the method may further include saving a snapshot of state of the on-demand development environment.

In one embodiment, the method may further include collecting performance metrics about the on-demand development environment, wherein the performance metrics include at least one of a time for the on-demand development environment to go live, a performance of the on-demand development environment, and an available capacity of the on-demand development environment.

According to another embodiment, an on-demand development system may include a plurality of clients; a server comprising at least one computer processor executing an on-demand application; a template repository comprising a plurality of build templates; and a plurality of endpoints, each end point executing an on-demand agent. The on-demand application may receive a request for an on-demand development environment for an application binary from one of the clients; verify that infrastructure for the on-demand development environment is not provisioned; identify a build template for the on-demand development environment; retrieve the build template from the template repository; select one of the plurality of endpoints for the on-demand development environment; initiates the on-demand development environment on the endpoint using the build template; and deploys the application binary to the on-demand development environment. The agent for the selected endpoint may unpack the application binary to the on-demand development environment.

In one embodiment, the on-demand development environment may be a container-based development environment.

In one embodiment, the endpoint may be selected based on at least one functional requirement including at least one of an identification one or more external services required for the application binary or a template received by the user interface.

In one embodiment, the endpoint may be selected based on at least one non-functional requirement including at least one of a size of the on-demand development environment, an available capacity for the endpoint, a performance of the endpoint, a data sensitivity of the application binary, and a cost of using the endpoint.

In one embodiment, the build template may include a Docker image.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
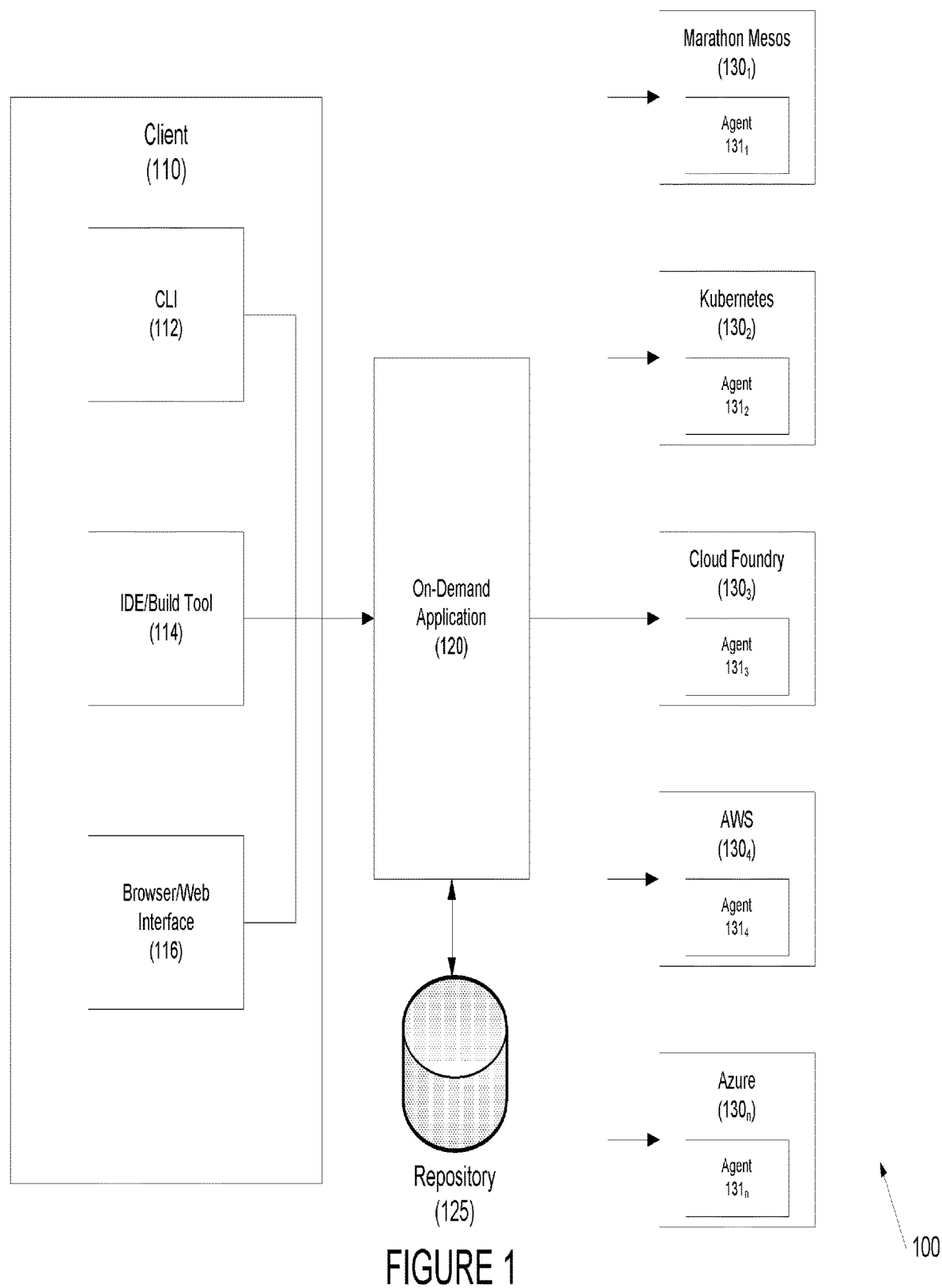
FIG. 1 depicts an architecture for an on-demand container-based development environment according to one embodiment.

Embodiments disclosed herein are directed to systems and methods for on-demand container-based development environments.

Current containers and Containers as a Service (CaaS) offerings provide virtualized servers for developers, but at significant overhead. Developers must therefore understand the internal workings of the APIs for the cloud offerings (e.g., Marathon/Mesos APIs, Kubernetes APIs, AWS APIs, etc.). Each of these express infrastructure as code to the developers in different languages. For example, each of the cloud providers may have their own API language that they have built for development teams to integrate with. Therefore, every developer has to learn, for example, the Kubernetes API, Marathon API, Cloud Foundry API, AWS APIs, etc. This can feel like completely different languages (or APIs) to a developer to memorize for each endpoint.

This causes two issues for developers. First, they have understand and code their infrastructure (additional overhead and code required) and second, developers are forced to understand competing API structures and dependencies in a very rapidly growing area.

In contrast, embodiments abstract developers from the infrastructure as code requirements by leveraging pre-built "Docker" templates. The templates cause an agent to perform application code deploy, which creates a separation of responsibilities for developer: the infrastructure as code stores the application infrastructure images (such as OS, application tech stack), and, at runtime, the application binaries themselves are injected into the running Docker image.

Application developers then can focus on their application logic and inject it into the runtime container when required. This also creates a community of pre-defined templates for developers to leverage, which promotes re-use across our feature teams.

By segregating the application logic from the application infrastructure, developers may stand up their own instances. For example, developers may rapidly provision, or destroy, an individual container across container endpoints. The environments may run on any container platforms, including containers that are internal to the organization, and containers that are external to the organization. The developer does not need to know how to deploy on each environments, or have to specify which environments that the application workload needs to run on. Instead, the developer may define the type of environment needed, and request a new one to be provisioned and configured.

Embodiments described herein are directed to a real-time development environment for sandbox testing or branch testing with access to individual environments available for feature teams. Embodiments may provision, configure, and start disposable development and sandbox environments on demand. Base templates may be instantiated for common application architectures (e.g., Java server-less, Java tomcat, Python, go, etc.), while development teams may make their own custom templates for more complex use cases or simply provide Dockerfiles and configurations for the appropriate endpoint.

Embodiments may create an abstraction between application developers, and needing to manage an ever-growing list of Platform as a Service (PaaS) and Infrastructure as a Service (IaaS) solution APIs that can change frequently and are specific to each endpoint. Application developers may request an environment with the services and a technical stack they need without needing to configure HA Proxies, providing API/CLI syntax per endpoint (e.g., Marathon Mesos, Cloud Foundry, Kubernetes, Fargate, EC2), etc.

Embodiments may provide some or all of the following features and benefits: (1) endpoint agnostic application builds and configuration; (2) reduced lead time for environments from months to minutes; (3) development environments may be provisioned only as needed; (4) abstraction layer over ever changing public/private cloud options; (5) deploy to running containers instead of recreating container images and rebuilding environment from scratch; (6) avoid expensive upload of application binaries to a repository (e.g., Quay) and instead leverage templates and deploy application binaries to running containers; (7) cross container portability for application logic without re-configuration or re-programming; (8) the ability to fail over workloads in a heterogeneous deployment footprint (across different container providers and internal/public environments); (9) separation of application logic from infrastructure as code to create reusable templates that a community of developers can source environments from and contribute to; (10) provide "hot" deployment of application logic to running containers without having to restart containers for application changes; (11) provide individualized environments for developers for a fail fast safe playing ground; (12) provide Environment as a Service capability (versus PaaS, IaaS or CaaS solutions) in which environments are consumable by developers without knowledge of or care about the underlying application or server infrastructure or containers; (13) provide true environment portability in that environments will span existing physical and virtual infrastructure in addition to container and cloud infrastructure; etc.

Referring to FIG. 1, an architecture for an on-demand container-based development environment is disclosed according to one embodiment. In one embodiment, system 100 may include client 110, on-demand application or server 120, and endpoints $130_1$, $130_2$, $130_3$, $130_4$, and $130_n$.

In one embodiment, client 110 may be used to provision and deploy environments. The environments may be for an individual, a feature branch, an application, etc. and include a single endpoint 130, multiple endpoints 130 (e.g., different types of endpoints 130, etc.).

Client 110 may include CLI 112, IDE/Build Tool 114, and browser/web interface 116. In one embodiment, developers may be presented with various, different ways to interact with on-demand application or server 120 so they may pick the one that is easiest for them to memorize. CLI 112 is a Windows and Linux compiled executable to which users may provide commands (e.g., ondemand start myapplication) from a command line window. The command window may run as a bash window for Linux environments or Windows command environment.

IDE and Build Tool 114 may provide similar functionality. With IDE and Build Tool 114, a command prompt may be provide in the existing tooling the developers use on a day-to-day basis to provide the same interaction that CLI 112 has, but with fewer clicks and in the program that they spend the majority of their time in already. As a build tool, environments may be provisioned and started from a Continuous Integration/Continuous Delivery pipeline as a build step (e.g., download code, compile, unit test, ondemand provision environment, deploy, automated testing, ondemand delete environment, deploy to QA).

Browser/Web Interface 116 may provide an interface via, for example, a website where developers may define their application metadata, upload their application binary via a graphical user interface, etc. This may be an alternative to using CLI 112 or IDE/Build Tool 114. The developer may manually enter the information they care about and point and click to deploy.

On-demand application or server 120 may comprise a computer program or application executed by a computer processor (e.g., a server) that may create an abstraction layer across PaaS and IaaS providers. On-demand application or server 120 may determine at runtime what endpoint/provider 130 is most suitable to the binary, instantiates one or more endpoint(s), and configures a technology stack required by the application.

In one embodiment, the decision of on-demand application or server 120 may be overridden if a specific endpoint 130 is desired.

In one embodiment, on-demand application or server 120 may include a plurality of build templates, which may be configured container/server images for common environment needs (e.g., Red Hat Linux 7, Java 8 plus Tomcat, etc.). In one embodiment, build templates may be pre-built and may be stored within repository 125 (commonly called a Quay) to be instantiated as required. Thus, for common use cases, a user may ignore the underlying endpoint configuration and deployment details.

Endpoints $130_1$, $130_2$, $130_3$, $130_4$ . . . $130_n$ may be provided. In one embodiment, each endpoint 130 may be a different container provider where multiple application templates can be started. An example endpoint 130 is Amazon Web Services (AWS). In AWS, multiple instances of the Java 8 template may be created, and each instance may be a runtime container for a single application binary. Each instance of a Java 8 template on AWS may have different configuration parameters for, for example, the size of memory, virtual CPUs, the amount of disk that is provisioned, etc.

Each instance of the template on endpoint 130 may contain one application binary and one copy of agent 131 running. Developers may also create multiple copies of an instance of a template on endpoint 130 (e.g., three Java 8 templates running on AWS). This gives the developers maximum flexibility in either very specifically defining their runtime environment (e.g., number of instances, type of template, endpoint, etc.), or giving very high level instructions and allowing on-demand application or server 120 to pick the most suitable values for the non-defined parameters.

In one embodiment, each endpoint 130 may have agent 131 installed. For example, agent 131 may be bundled with container templates or otherwise installed by on-demand application or server 120. When started (e.g., upon provisioning of a container), agent 131 may listen for commands to deploy code packages on the endpoint. Code packages may then be uploaded directly to endpoint 130 via agent 131, which may manage the installation, including stopping existing processes, deploying the new binaries to the correct locations on the filesystem, configuring runtime parameters or environment variables and starting the application itself.

Figure 2:
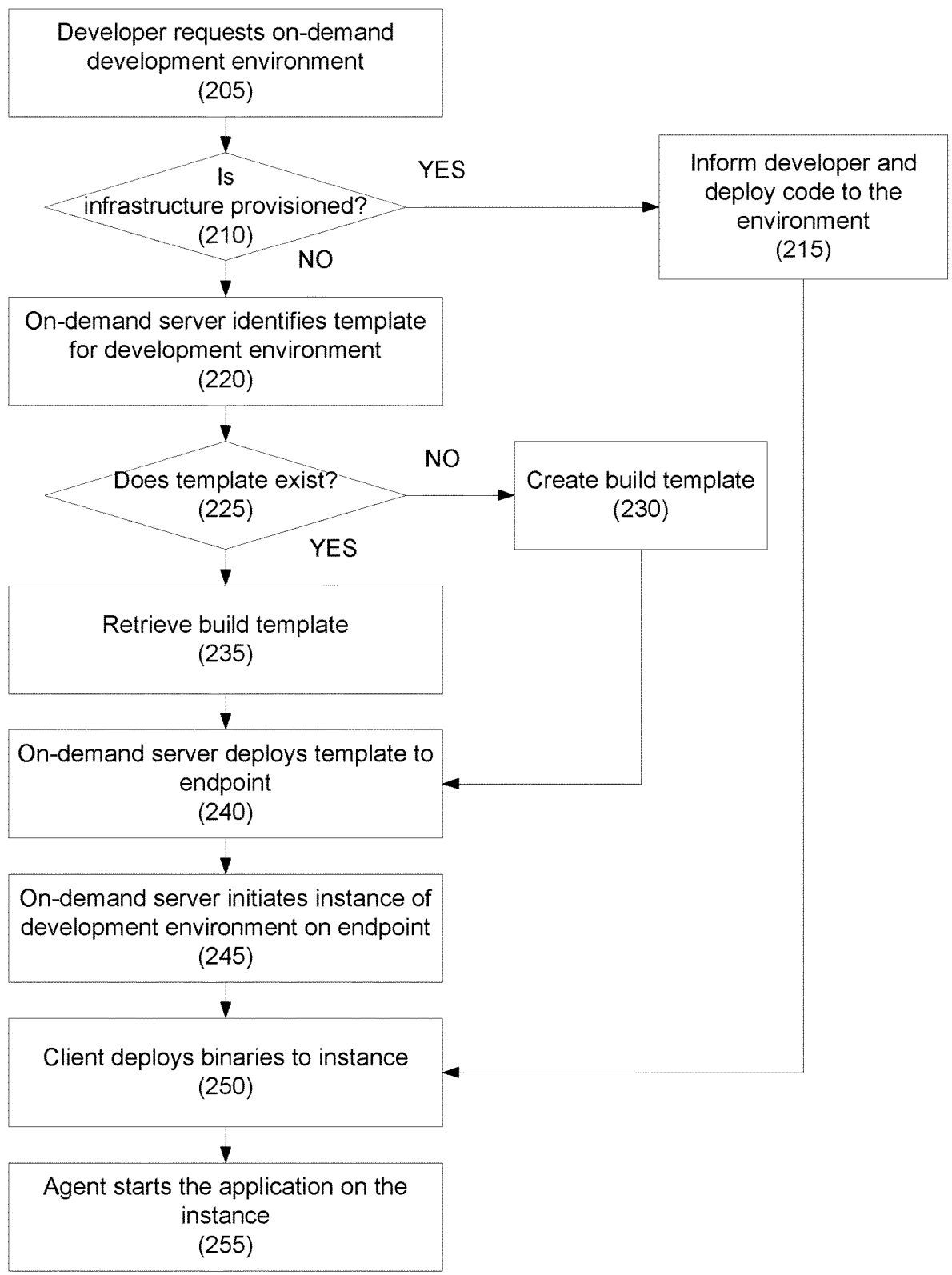
FIG. 2 depicts method for using an on-demand container-based development environment according to one embodiment.

Referring to FIG. 2, a method for using an on-demand container-based development environment is disclosed according to one embodiment.

In step 205, a developer, at a client, may request an on-demand container-based development environment for code from a computer application, such as an on-demand application or server. In one embodiment, the developer may specify details for the environment; for example, components for the environment, such as the template, source, run command, ports, etc.

In step 210, the on-demand application or server may check to see if infrastructure for the development environment is provisioned. If it is, in step 215, the developer may be informed, and the client may communicate the code to the provisioned environment.

In one embodiment, if infrastructure exists, the endpoint having that infrastructure may be selected provided that the endpoint is still available and has capacity. In one embodiment, a user may specify, or override, the endpoint selection to force an environment to be built on an endpoint of their choice (e.g., if the developer decides they will go to production on a particular container such as AWS, there's no point in putting their development on Kubernetes).

If the user does not specify or force an endpoint, the endpoint may be selected based on, for example, functional an non-functional requirements. Examples of functional requirements include the external services required for the application binary, the type of template that they selected (e.g. some templates will only run on certain endpoints), etc. Examples of non-functional requirements include the size of instance requested and available capacity on the endpoint (e.g., is an endpoint over 80% utilized), endpoint availability (e.g., is AWS down), performance of the endpoint (e.g., has Cloud Foundry started to slow down), data sensitivity of the application (e.g., private data cannot go to public cloud endpoints), the cost of the workload on the endpoints (where is it cheapest to run), etc.

If the infrastructure is not provisioned, in step 220, the on-demand server may identify a build template that is necessary for the environment, and may select an endpoint (as described above). In one embodiment, the build template today may include, for example, the operating system version (e.g., Red Hat Enterprise Linux 7, etc.), any combination of application infrastructure components (e.g., Java 8, Apache Tomcat 7, Python miniconda 3, etc.). A template may have multiple application infrastructure components (such as Java 8 and Tomcat 7). A template may also include a copy of the on-demand agent running, for example, on port 8090 for the application container. Debugging may be supported by including or providing monitoring and alerting tools for the application container (e.g., top, vmstat, SystemTap).

For example, the on-demand server may base the build template on specifications provided by the developer, by analyzing the job, by comparing the job to a prior job, etc.

In step 225, the on-demand server may determine whether the qbuild template exists. In one embodiment, the on-demand application or server may have the coordinates for template(s) that have been pre-built into Docker image(s). The Docker image may contain, for example, an operating system, an application infrastructure components, and an on-demand agent).

If a build template does not exist, in step 230, the build template is created. For example, the on-demand server or application will wait until the Docker compilation is completed, and the Docker image is in the image repository before continuing. Once the Docker image is available in the image repository (either because it is being reused from a previous build or the build finishes), the on-demand server or application may instruct the endpoint provider to create a new instance of the Docker image running on that endpoint.

If the build template exists, in step 240, the on-demand server may select that build template.

In step 245, the on-demand server may initiate an instance of the development environment on the endpoint. For example, the on-demand server may provision the infrastructure within the appropriate environment (e.g., Marathon Mesos, Cloud Foundry, AWS, Kubernetes, etc.) and may start the agent on the endpoint(s).

In step 250, the on-demand server may direct the client to the agent, and the client may deploy a code package (e.g., binaries) to the agent.

In step 255, the agent may unpack the code package, and may start the application on the endpoint(s)

Following use of the environment, the environment may be deactivated. For example, a snapshot of the data on disk may be taken so that the "state" of the environment can be restored in the future if, for example, the user wants to "go back" to the environment at a certain point in the past. The API for the endpoint the environment was provisioned to may be deleted or destroyed, which also destroys the container.

In one embodiment, automated performance metrics about the time to live, the performance of the environment, and the available capacity may be captured to evaluate non-functional availability and performance of the environments. In one embodiment, these and other metrics may be used in selecting the endpoints, templates, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using an on-demand development environment, comprising:
   in an information processing apparatus comprising at least one computer processor:
   receiving, from a user interface, a request for an on-demand development environment for an application binary;
   verifying that infrastructure for the on-demand development environment is not provisioned;

identifying a build template from a template repository for the on-demand development environment, the build template comprising a Docker image comprising an operating system, application infrastructure components, and/or an on-demand agent, the template repository comprising a plurality of build templates;

selecting an endpoint for the on-demand development environment;

initiating the on-demand development environment on the selected endpoint using the build template; and deploying the application binary to the on-demand development environment, wherein the application binary is injected into a runtime container.

2. The method of claim 1, wherein the on-demand development environment is a container-based development environment.

3. The method of claim 1, further comprising determining whether a build template exists.

4. The method of claim 1, wherein the request includes at least one of a template, a source, a run command, and a port.

5. The method of claim 1, wherein the endpoint is selected based on at least one functional requirement.

6. The method of claim 5, wherein the functional requirements comprise an identification one or more external services required for the application binary or a template received by the user interface.

7. The method of claim 1, wherein the endpoint is selected based on at least one non-functional requirement.

8. The method of claim 7, wherein the non-functional requirement includes at least one of a size of the on-demand development environment, an available capacity for the endpoint, a performance of the endpoint, a data sensitivity of the application binary, and a cost of using the endpoint.

9. The method of claim 1, wherein the Docker image further comprises a port and/or a debugging tool.

10. The method of claim 1, wherein the Docker image is retrieved from an image repository.

11. The method of claim 1, wherein the build template is selected based on a build template used in a prior request for an on-demand development environment.

12. The method of claim 1, wherein the endpoint is one of Marathon Mesos, Cloud Foundry, AWS, and Kubernetes.

13. The method of claim 12, further comprising: saving a snapshot of state of the on-demand development environment.

14. The method of claim 1, further comprising: deactivating the on-demand development environment.

15. The method of claim 1, further comprising:

collecting performance metrics about the on-demand development environment, wherein the performance metrics include at least one of a time for the on-demand development environment to go live, a performance of the on-demand development environment, and an available capacity of the on-demand development environment.

16. An on-demand development system, comprising:
a plurality of clients;
a server comprising at least one computer processor executing an on-demand application;
a template repository comprising a plurality of build templates; and
a plurality of endpoints, each end point executing an on-demand agent;
wherein:
the on-demand application receives a request for an on-demand development environment for an application binary from one of the clients;
the on-demand application verifies that infrastructure for the on-demand development environment is not provisioned;
the on-demand application identifies a build template for the on-demand development environment from the plurality of build templates, the build template comprising a Docker image comprising an operating system, application infrastructure components, and/or an on-demand agent;
the on-demand application retrieves the build template from the template repository;
the on-demand application selects one of the plurality of endpoints for the on-demand development environment;
the on-demand application initiates the on-demand development environment on the endpoint using the build template;
the on-demand application deploys the application binary to the on-demand development environment; and
the agent for the selected endpoint unpacks the application binary to the on-demand development environment, wherein the application binary is injected into a runtime container.

17. The system of claim 16, wherein the on-demand development environment is a container-based development environment.

18. The system of claim 16, wherein the endpoint is selected based on at least one functional requirement including at least one of an identification one or more external services required for the application binary or a template received by a user interface.

19. The system of claim 16, wherein the endpoint is selected based on at least one non-functional requirement including at least one of a size of the on-demand development environment, an available capacity for the endpoint, a performance of the endpoint, a data sensitivity of the application binary, and a cost of using the endpoint.

* * * * *